Figure 1:
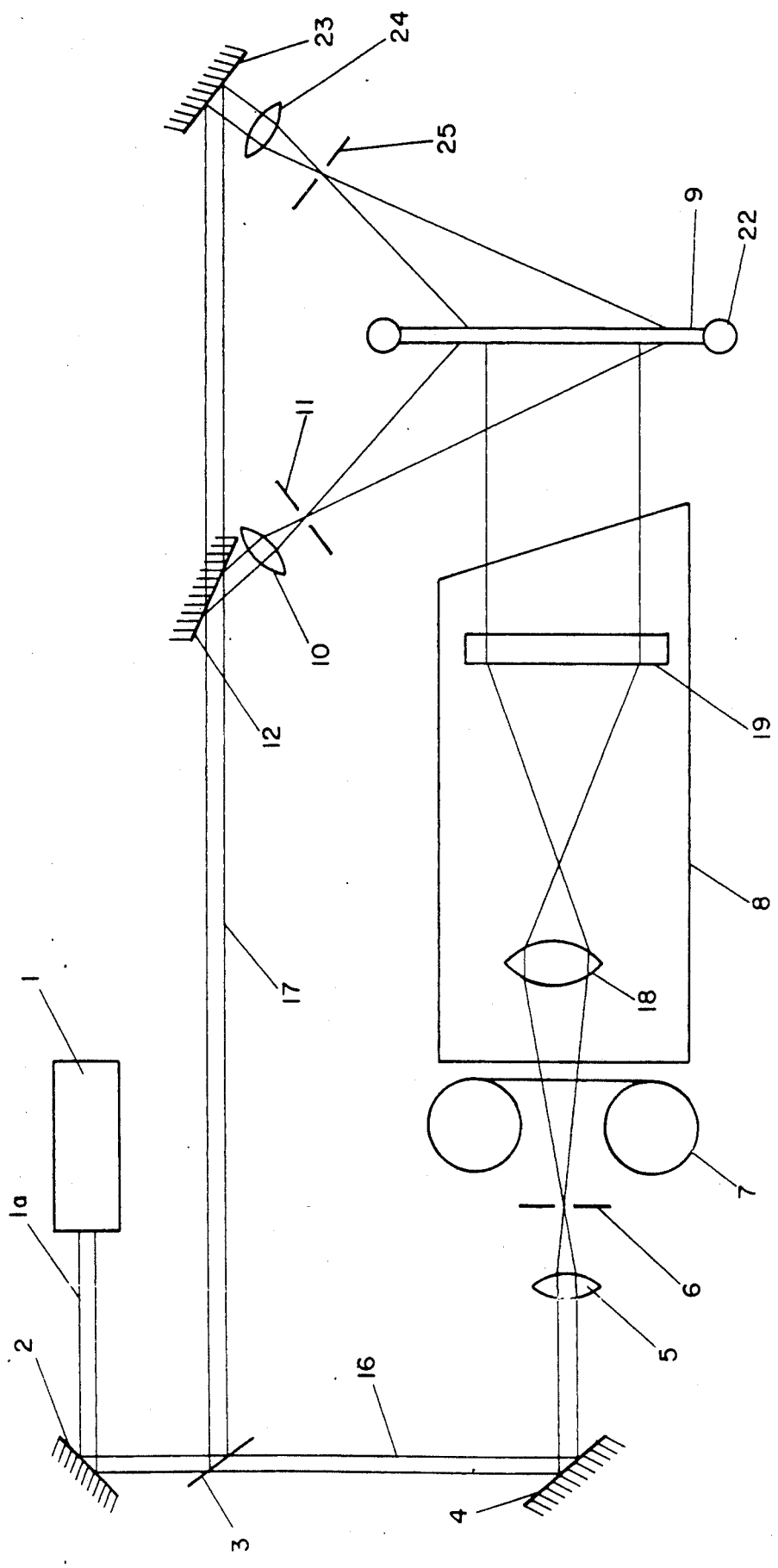

United States Patent [19]

Zabka

[11] Patent Number: 5,046,792

[45] Date of Patent: Sep. 10, 1991

[54] HOLOGRAPHIC PRINTER

[76] Inventor: Britton Zabka, 705 Horseshoe Trail SE., Albuquerque, N. Mex. 87123

[21] Appl. No.: 449,768

[22] Filed: Dec. 13, 1989

[51] Int. Cl.[5] .............................................. G03H 1/04
[52] U.S. Cl. ......................................... 359/26; 359/1; 359/28; 359/22
[58] Field of Search ...................... 350/3.6, 3.75, 3.76, 350/3.77, 3.78, 3.79

[56] References Cited

U.S. PATENT DOCUMENTS

| | | | |
|---|---|---|---|
| 3,598,484 | 8/1971 | Redman | 350/3.76 |
| 3,675,012 | 7/1972 | Derderian et al. | 350/3.79 |
| 3,820,869 | 6/1974 | Bolusset et al. | 350/3.75 |
| 3,822,087 | 7/1974 | Bolusset et al. | 350/3.75 |

Primary Examiner—Paul M. Dzierzynski
Assistant Examiner—J. P. Ryan
Attorney, Agent, or Firm—DeWitt M. Morgan

[57] ABSTRACT

This invention is an optical printer that translates and records visual information that can be seen with ambient light in the first generation holographic printing. The invention permits recording of the information to be made into the light sensitive emulsion as a relief. The result is a stereo-optical, multichannel holographic recording of said information. Applications of the invention may include the commercial photography industry, cinematography, medical, passports, drivers' licenses, security entrance control systems, military, point of purchase advertising, publishing and security as well as other uses connected with all relevant existing holographic technology.

16 Claims, 4 Drawing Sheets

FIG—1

HOLOGRAPHIC PRINTER

FIELD OF THE INVENTION

This invention relates to the field of holographic printers.

BACKGROUND OF THE INVENTION

The overall view expressed regarding the commercial exploitation of a 3-D communication media has been that of dissatisfaction due to the absence of quality, the prohibitive expense and timely considerations.

The vast potential of such a medium can only be compared to that of a television.

V. G. Komar, of the Moscow Holographic Research Institute (NIKFI), over the past several years has proposed a method of pulsed coherent light used for indoor filming. A lenticular plate is put in the camera and a special image is stored on the film stock. The Raster Image is then converted into a hologram.

It is possible to develop pulsed lasers with wavelengths ranging from 530 nanometers to 660 nanometers (using yttrium aluminum garnet harmonics of the second order). It is more difficult to create a pulsed laser in the blue part of the spectrum, furthermore a solid powerful high repetition rate pulsed laser has not been developed with suitable characteristics to project a film in real time.

Another problem is the creation of the film stock for color pulsed shooting. Holograms must have a sensitivity corresponding to a useful exposure from 2 to 4 microjoules per square centimeter. They must have a high diffraction efficiency and a low level of noise. Because images are projected off a lenticular screen to the viewer, the size and viewing capabilities are also impaired.

The Acromatic Process projects an object beam on an opal screen and then the transporting reference beam along a horizontal tract with a vertical slit. The process produces a hologram that can only be seen with an expensive coherent light source. It must have a second step process to copy the master hologram, thus multiplying the time process by an even greater factor than the one previously explained.

The proposed invention is a unique process which solves these problems, in the first generation printing, while using neither the pulsed not the slit method.

This invention will expand the reference beam and the object beam with no cylindrical lens elements. This will produce a one-step image plane holographic movie that can be illuminated by regular ambient light. The image beam expanded on a flat film holder will produce a focused, evenly distributed image unhampered by the distortion caused by optical elements resulting in vastly improved quality.

The printing process will be greatly increased by efficiently and more rapidly producing holograms from sequential perspectives of movie or video footage. Overlapping larger amounts of information an smaller space gives optimum channel recording in emulsion, and improved viewing of larger amounts of information on playback. Because this process produces a one-step image plane on a flat surface, any light sensitive paste can by used. Choice of emulsions provides optimum results by offering a larger spectrum of sensitivities. Silver halide, dichromate gelatin or photo resist can be used. The masters are then transferred to an embossed print, pressing master print into thermoplastic, thus eliminating the second chemical process, making mass production both fast and cost effective.

One-step reflection holograms can be easily made by bringing reference beams in behind the plate, utilizing color selection well known for reflection holograms. This brings out color dispersion of near real color while also utilizing all of the other advanced techniques of processing previously mentioned.

In the last decade leading American researchers Steven Benton and Lloyd Cross have reported certain difficulties in both the Integral Holographic movie process and the Acromatic Hologram. These difficulties include:

1. Time Distortion causing the subject to blur in movement.
2. Vertical Slits Registration resulting in unwanted lines breaking up images.
3. Perspective Distortion resulting from images away from center.
4. Unacceptable Print Translation Period now requiring hours of printing for seconds of movies.
5. Exorbitant Production Costs due to the complexity of available apparatus.
6. Two Complete Printing Processes Required to Create Image Plane Movies resulting in a doubling of both time and expense of the system.
7. Cylindrical Lens Used In Object Projection distorting the image and resulting in time smearing. This also results in the printing of unwanted vertical lines throughout the image.
8. Use of Curved Film Holder restricting viewing to a curved screen.
9. Vibration resulting in the cancelling of imagery recorded in a linear fashion.

SUMMARY OF THE INVENTION

A new and improved holographic printer for producing white light viewable image plane holograms. The printer includes a source of coherent light, apparatus for dividing this source into an object beam and a reference beam and a recording medium. The recording medium is positioned on the optical axes of both the object beam and the reference beam. In one embodiment the printer includes apparatus for supporting one or more transparent images and a projection lens, both positioned along the optical axis of the object beam between the beam divider and the reading medium. In an alternate embodiment, the printer includes a rotatable platform for supporting a three dimensional object in the path of the object beam, between the beam divider and the recording medium. In both embodiments the apparatus for supporting the transparent image (and projection lens) and the apparatus for supporting the three dimensional object are, together with the recording medium, supported for rotation about the axis of the object beam. The printer also includes apparatus for projecting the reference beam onto the recording medium in such a manner that it is fully superimposed over the image produced by the object beam. In operation, the object beam and the reference beam are simultaneously projected into the recording medium. Between exposures, the recording medium and the apparatus for supporting the transparency (or 3-D object) are simultaneously rotated about the axis of the object beam.

The invention will be more readily understood by referring to the several Figures of the Drawings.

FIG. 1 is a Plain View of the Printer.

Figure 2:
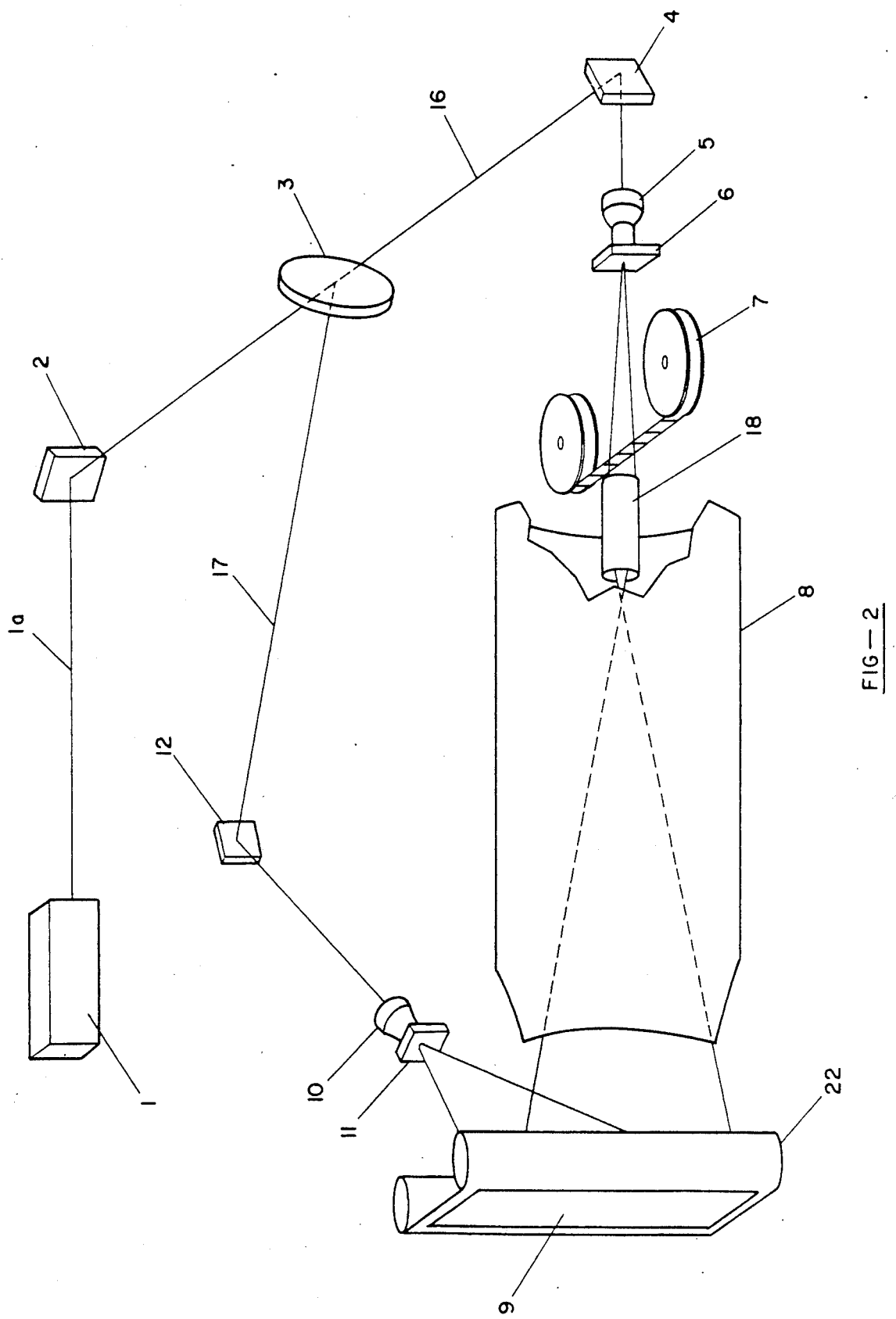
Figure 3:
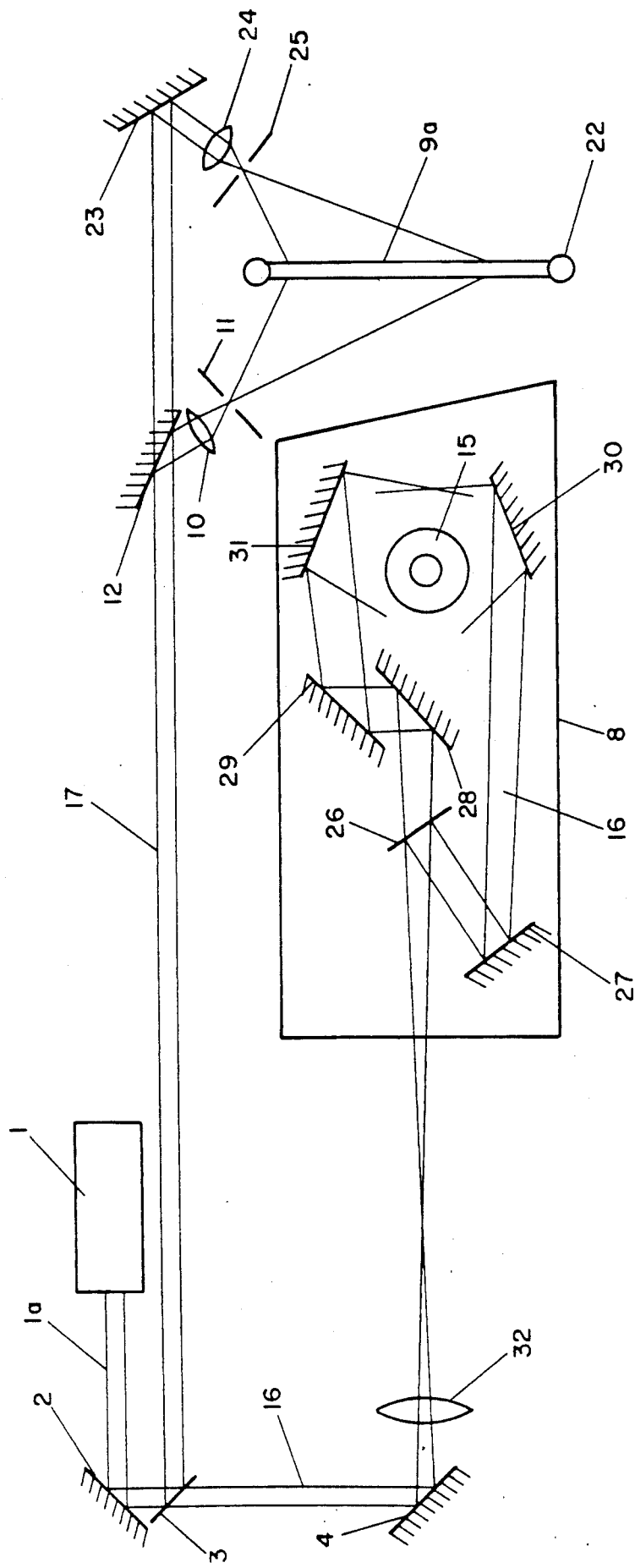
Figure 4:
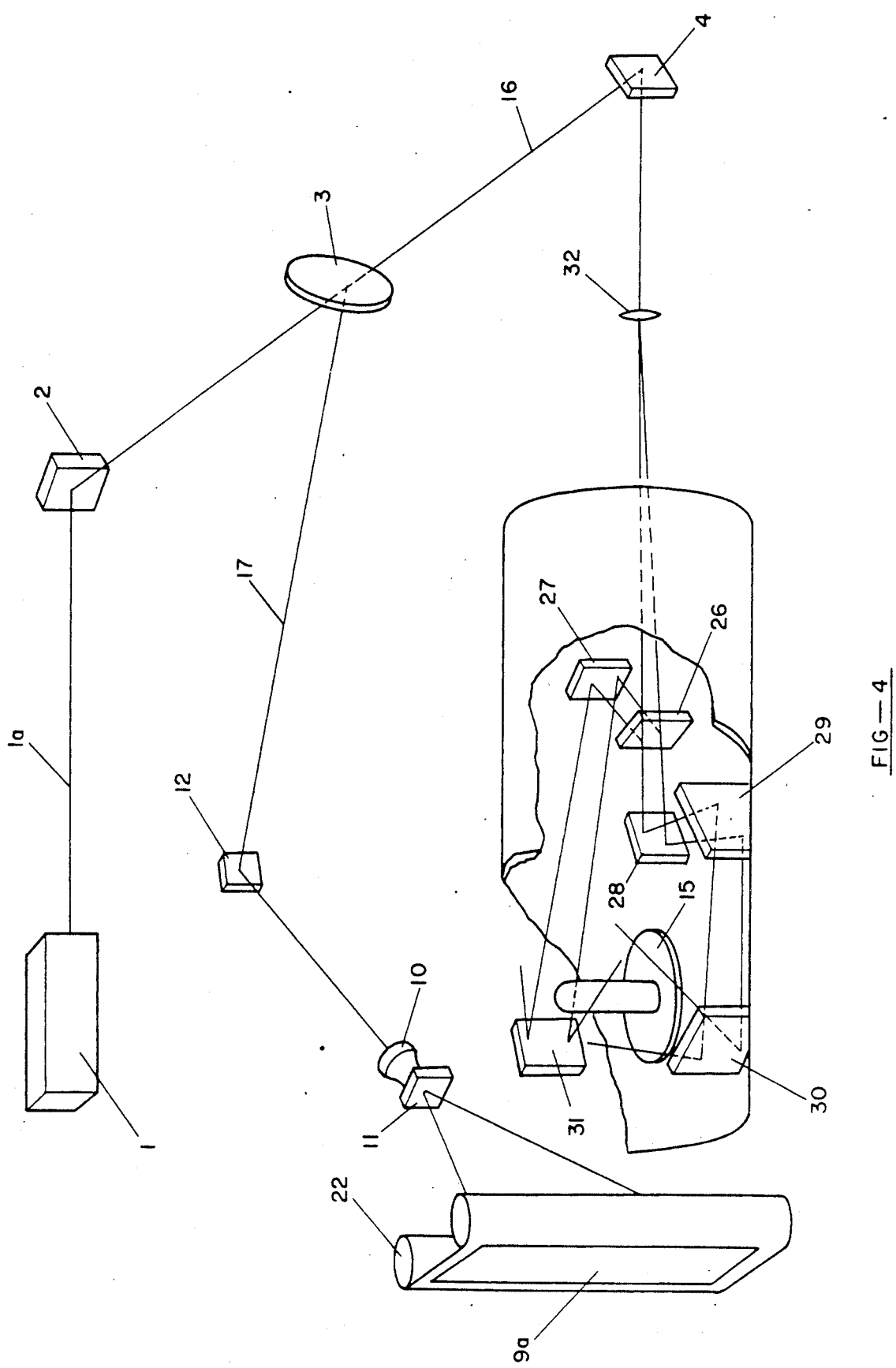

FIG. 2 is a Prospective View of the Printer of FIG. 1.
FIG. 3 is a Plain View of a 3-D Printer.
FIG. 4 is a Perspective View of the 3-D Printer of FIG. 3.

GLOSSARY OF PARTS

The invention is more readily understood by assigning numbers to the various parts, as they appear in the drawings, as follows:

(1) Laser
(2) Front Surface Mirror
(3) Beam Splitter
(4) Front Surface Mirror
(5) Microscope Objective (diverging lens)
(6) Spatial Filter
(7) Projector means
(8) Cylinder (rotation means)
(9) Holographic film holder
(10) Microscope Objective
(11) Spatial Filter
(12) Front Surface Mirror
(13) Secondary Beam Splitter
(15) Rotating Inner Platforms
(16) Object Beam Path
(17) Reference Beam Path
(18) Projection Lens
(19) Collimating Lens
(22) Holographic Film Advance
(23) Front Surface Mirror (laser optical path)
(24) Lens
(25) Spatial Filter
(27) Front Surface Mirror (laser optical path)
(28) Front Surface Mirror
(29) Front Surface Mirror
(30) Front Surface Mirror
(31) Front Surface Mirror
(32) Lens With reference to FIGS. 1 and 2, laser (1) generates a beam of coherent light (1a) that is directed by front surface mirror (2) onto beam splitter (3) which divides beam (1a) into object beam (16) and reference beam (17). The beam (16) is aligned with the optical axis of projection lens (18) via front surface mirror (4). Between mirror (4) and projection lens (18), object beam (16) passes through short focal lens (5), which causes the beam to converge at spatial (or pinhole) filter (6), which removes coherent noise from object beam (16). As is also evident from FIG. 1, after passing through filter (6), beam (16) diverges and passes through projector means (7). In the embodiment illustrated in FIGS. 1 and 2, projector means (7) takes the form of means for supporting and moving a series of images formed on transparent film, such as movie or slide film. The object beam (16) is then projected by projection lens (18) through collimating lens (19) onto the recording medium (9a) supported by film holder (9). As those skilled in the art will appreciate, projection lens (18) produces a spherical wave front which enlarges the whole image evenly and also focuses such image on the recording medium (9a).

Again with reference to FIGS. 1 and 2, the reference beam (17) of laser beam (1a) is aligned with the axis of a reference beam projector by front surface mirror (12). The reference beam projector may include, for example, microscope objective (10), which caues beam (17) to converge at spatial (or pinhole) filter (11) before expanding. Microscope objective (10) also functions to project beam (17) onto recording medium (9a) such that the reference beam is projected over the entire image produced by the object beam 16, in a full overlapping fashion as illustrated in FIGS. 1 and 2. Thus, reference beam (17) is superimposed onto the image produced by object beam (16) at the front surface of recording medium (9a). Alternately, as is also illustrated in FIG. 1, reference beam (17) may be projected onto the back surface of recording medium (9a) via front surface mirror (23), microscope lens (24) and spatial (pinhole) filter (25) to produce a reflection hologram. Again, as projected onto the back surface of recording medium (9a), the reference beam (17) overlaps and is superimposed on the image produced by object beam (16).

As is also apparent from FIGS. 1 and 2 holographic recording medium (9a) is arranged perpendicular to the optical path defined by the superimposed optical axes of microscope objective (5), projection lens (18) and collimating lens (19). As is apparent to those skilled in the art, the projection means (7) positions the transparent images in a plane which is perpendicular to the axis defined by lens (5), (18) and (19). The projection means (7), whether a film projector, means for positioning a video image projection means, or transparencies, is mounted within cylinder (8), which rotates about the axis defined by lenses (5), (18) and (19). The holographic recording medium (9a) is also positioned on or connected to cylinder 8, so that both the projection means (7) and recording medium (9a) are periodically rotated in discrete amounts by any suitable conventional drive system such as a stepping motor (not shown).

In a typical operating mode, the projection means (7) advances the film, in unison with rotation of cylinder (8), a discrete increment while the laser shutter is closed. After a predetermined time during which the system vibrations dampen out, the laser shutter is open for a predetermined time to project the object beam (16) and reference beam (17) onto the recording medium (9a). The shutter is then closed, the transparent images are advanced to the next frame, and the recording medium (9a) is incrementally rotated with projection means (7) and projection lens (18) and the next hologram is exposed.

The reference beam (17) remains constant so as to allow a new reference angle to be created by the object beam (16) in a rotating cylinder (8).

The printer that records 3-D objects is similar, with the addition of a rotating inner platform (15) that rotates the subject in a circular, horizontal direction while the cylinder (8) moves as with the transparencies.

Although the transmissions are laser viewable and reflective ambient light viewable as in standard holography, this process can include either a reflection or a transmission hologram depending upon the location of the reference beam (17) which can be placed in the front for transmission, or in the back for reflection holograms. The automated system may include a holographic film advance (22) to produce continuous individual holographic sequences.

A multi-wavelength laser system including representative reference angles can produce pseudo-color images.

With respect to the collimating lens (19), it will be appreciated that while this is shown in the embodiment, it is not an essential part of the invention, but is merely indicated to complete the particular embodiment. Proven holograms have been made of different size dimensions by an expanding beam.

APPLICATIONS AND ADVANTAGES OF THE INVENTION

The proposed invention is a major breakthrough in the holographic industry. One major advantage of this printer is its ability to produce holograms at a rate that is one hundred times faster than the existing holographic printing processes. This increased speed makes it possible to produce holograms at dramatically reduced prices. Some possible fields for this technology include security, commercial photography and medical applications.

Security applications are based on the creation of nonforgable, individual photographic identification. Several views of a person's face will be overlaid on a holographic security emblem and an identification number if applicable. Security applications are relevant to military security, passports, credit cards, government clearances and drivers' licenses to name a few.

The cost factors involved with this invention will offer consumers the ability to create three dimensional photographs for approximately ten dollars. Customers will use their existing 35 mm cameras and standard slide or movie film to create film sequences. A typical application is portrait photography. Photographers will take frames of a subject's face as the head is moved from left to right. The strip of film will then be processed through the holographic printer, and a holographic portrait will be created.

In the medical field this holographic printing process will lend itself to the three dimensional reconstruction of medical radiological images, including X-rays, ultrasound, CAT Scans and MRI. Every year over two hundred and twenty million radiological images are generated in the United States alone.

While the foregoing examples show specific applications of the principles of the invention, it will be appreciated that many variations can be made without departing from the scope of the invention. Accordingly, I intend to be bound only by the following claims.

I CLAIM:

1. A holographic printer comprising:
   a. a source of coherent light;
   b. means for dividing said source into first and second beams, said first beam defining a first optical axis, said second beam defining a second optical axis;
   c. first means, positioned along said first optical axis, for supporting one or more transparent images;
   d. recording means positioned along both said first and second optical axes;
   e. optical projection means positioned along said first optical axis between said recording means and said first supporting means, said projection means focusing the image of said transparent image on the front surface of said recording means;
   f. second means for supporting said first supporting means, said projection means and said recording means and for simultaneously rotating said first supporting means, said projection means and said recording means about said first optical axis; and
   g. means for projecting said second beam onto said recording means in such a manner that said second beam is fully superimposed over said first beam.

2. The printer as set forth in claim 1, wherein said second beam is projected onto said front surface of said recording means, to form a transmission image plane hologram.

3. The printer as set forth in claim 2, wherein said means for projecting said second beam includes an objective lens means.

4. The printer as set forth in claim 1, wherein said second beam is projected onto the back surface of said recording means, to form a reflection image plane hologram.

5. The printer as set forth in claim 4, wherein said means for projecting said second beam includes an objective lens means.

6. The printer as set forth in claim 1, further including an objective lens means and a spatial filter positioned along said first optical axis between said dividing means and said first supporting means, said filter eliminating coherent noise.

7. The printer as set forth in claim 6, further including a columination lens, said columinating lens positioned along said first optical axis between said optical projection means and said recording means.

8. A holographic printer comprising:
   a. a source of coherent light;
   b. means for dividing said source into first and second beams, said first beam defining a first optical axis, said second beam defining a second optical axis;
   c. recording means positioned along both said first and optical axes;
   d. first means for supporting at least one three dimensional object, said first supporting means being positioned along said first optical axis such that said three dimensional object is illuminated by said first beam and at least a portion of the light is reflected by said object onto said recording means;
   e. second means for supporting said first supporting means and said recording means and for simultaneously rotating said first supporting means and said recording means about said first optical axis; and
   f. means for projecting said second beam onto said recording means in such a manner that said second beam is fully superimposed over said first beam.

9. The apparatus as set forth in claim 8, wherein said first support means is rotatably supported relative to said second support means.

10. The apparatus as set forth in claim 9, wherein said first support means is rotated about an axis perpendicular to said first optical axis.

11. The apparatus as set forth in claim 8, further including second means for dividing said first beam into a first object beam and a second object beam, and means for directing said object beams onto said three dimensional object.

12. The apparatus as set forth in claim 8, wherein said second beam is projected onto said front surface of said recording means, to form a transmission image plane hologram.

13. The apparatus as set forth in claim 12, wherein said means for projecting said second beam includes an objective lens means.

14. The apparatus as set forth in claim 8, wherein said second beam is projected onto the back surface of said recording means, to form a reflection image plane hologram.

15. The apparatus as set forth in claim 14, the printer as set forth in claim 9, wherein said means for projecting said second beam includes an objective lens means.

16. A method of producing a white light viewable multiple image plain hologram, said method comprising the steps of:

a. providing two beams of coherent light, an object beam and a reference beam;
b. providing a recording medium;
c. directing said object beam first through a transparency and then through a projection lens means to provide an expanded image of the image on said transparency on said reading medium;
d. simultaneously with projecting said expanded image onto said recording medium, projecting said reference beam onto said recording medium, such that said reference beam fully overlaps said expanded image; and
e. between exposures of said recording medium rotating said transparency, said projection lens means and said recording medium about the axis of said object beam.

* * * * *